United States Patent
Brey et al.

(10) Patent No.: US 8,006,108 B2
(45) Date of Patent: Aug. 23, 2011

(54) DYNAMIC SELECTION OF GROUP AND DEVICE POWER LIMITS

(75) Inventors: Thomas M. Brey, Cary, NC (US); William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 11/936,923

(22) Filed: Nov. 8, 2007

(65) Prior Publication Data

US 2009/0125737 A1   May 14, 2009

(51) Int. Cl.
 *G06F 1/32* (2006.01)
(52) U.S. Cl. ........................ 713/320; 713/340
(58) Field of Classification Search .................. 713/320, 713/340
 See application file for complete search history.

(56) References Cited

U.S. PATENT DOCUMENTS

| | | | |
|---|---|---|---|
| 3,602,703 A | 8/1971 | Polenz | |
| 5,254,937 A * | 10/1993 | Mizoguchi | 323/283 |
| 6,223,056 B1 * | 4/2001 | Appel | 455/561 |
| 6,859,882 B2 | 2/2005 | Fung | |
| 6,925,573 B2 * | 8/2005 | Bodas | 713/320 |
| 7,043,647 B2 | 5/2006 | Hansen et al. | |
| 7,055,659 B2 | 6/2006 | Tsai | |
| 7,155,623 B2 * | 12/2006 | Lefurgy et al. | 713/324 |
| 7,228,441 B2 | 6/2007 | Fung | |
| 7,363,517 B2 * | 4/2008 | Bodas | 713/300 |
| 2003/0056125 A1 * | 3/2003 | O'Conner et al. | 713/300 |
| 2005/0015632 A1 * | 1/2005 | Chheda et al. | 713/300 |
| 2005/0044202 A1 * | 2/2005 | Shirota | 709/223 |
| 2005/0102544 A1 * | 5/2005 | Brewer et al. | 713/320 |
| 2005/0138438 A1 * | 6/2005 | Bodas | 713/300 |
| 2006/0161794 A1 * | 7/2006 | Chiasson et al. | 713/300 |
| 2006/0288241 A1 | 12/2006 | Felter et al. | |
| 2007/0050644 A1 | 3/2007 | Merkin | |
| 2007/0101173 A1 | 5/2007 | Fung | |
| 2007/0143640 A1 * | 6/2007 | Simeral et al. | 713/320 |
| 2009/0150689 A1 | 6/2009 | Simeral et al. | |

FOREIGN PATENT DOCUMENTS

| | | |
|---|---|---|
| CN | 1624627 A | 6/2005 |
| CN | 1983120 A | 6/2007 |

OTHER PUBLICATIONS (Chinese Office Action PRD48368) Document 100101 dated May 11, 2010, 5 pages.
English Abstract CN1624627, Published Jun. 8, 2005, 1 page.
English Abstract CN1983120, Published Jun. 20, 2007, 1 page.

* cited by examiner

*Primary Examiner* — Chun Cao
(74) *Attorney, Agent, or Firm* — Cynthia G. Seal; Jeffrey L. Streets

(57) ABSTRACT

A variable group power limit is enforced to limit the net power consumption of a group of devices in a computer system, and a variable device power limit enforced on each device is independently adjustable to satisfy the current group power limit. The device power limits are dynamically selected according to a power management method that selectively reduces the device power limits of lower-utilization devices and increases the device power limits of higher-utilization devices.

18 Claims, 5 Drawing Sheets

DYNAMIC SELECTION OF GROUP AND DEVICE POWER LIMITS

BACKGROUND OF THE INVENTION

1. Field of the Invention

The present invention relates to power management in an electronic system such as a computer system having multiple energy-consuming electronic devices.

2. Description of the Related Art

Servers and other computer hardware are often grouped together on a rack to conserve space and place the servers and infrastructure in a central location for access by an administrator. Managing these "rack systems" can be less difficult and less expensive than separately administering a multitude of scattered servers. A variety of rack system designs are available in the market, and range in size and density. Some rack systems may be built around servers that are self-supporting in that each server has an individual chassis, on-board power supply, cooling fan, and other support devices. The self-supporting servers may be grouped in a rack or tower configuration and networked to each other and to client computers. A higher density rack system can be achieved using leaner "blade servers" with shared support modules that are connected in a multi-blade chassis. Blade servers generally achieve greater density due to having a narrower form factor and sharing support modules such as blower and power modules. Some of the more compact rack system server arrangements presently available include the SYSTEM X servers and eServer BLADECENTER available from IBM (IBM, BLADECENTER, and SYSTEM X are registered trademarks of International Business Machines Corporation, Armonk, N.Y.).

Power management is important for many aspects of operating a rack system, such as to minimize the costs of operating the servers, control the heat generated by the servers, and to optimize the performance and efficiency of the system. A feedback-based power management system may involve, for example, a motherboard having a built-in power meter circuit, ACPI, and other hardware and/or software elements. Systems may be powered by a common power supply or power distribution unit (PDU). Some of the systems include a circuit, such as a Baseboard Management Controller (BMC), that a service processor uses to monitor real-time power consumption by a server. Using this feedback, the service processor can "throttle" the processors and/or memory on the server to maintain the power consumption below a set point or "power ceiling" set by an administrator and monitored by the chassis management module.

A number of methods are known for controlling power consumption of servers individually. These methods include various methods of "power capping." Power capping involves enforcing a power limit upon a server by selectively reducing processor performance. The server may enforce the power limit, for example, using the power meter to measure the amount of power drawn and instantaneously responding to increases in power consumption by throttling the processors and/or memory when a power threshold is reached. While power-capping techniques are useful for managing power consumption of a server individually, other system-wide parameters also need to be considered. For example, power constraints on the system as a whole need to be considered, in addition to managing power consumption to the servers individually. Furthermore, the aggregate margins between each server's power cap and its actual power consumption represents unused power availability.

Improved power-management techniques are therefore sought to address both server-level and system-level power considerations. In particular, it would be desirable to better utilize the power available to the system and to maximize throughput on the servers. It would also be desirable to provide a power management method that is responsive to the variable demands placed on the system, and which accounts for policy settings that may be imposed upon the system.

SUMMARY OF THE INVENTION

One embodiment provides a method of limiting power consumption by an electronic system having a plurality of power-consuming electronic devices. A group power limit for the plurality of devices is selected and a device power limit is selected and enforced for each device. The device power limits are dynamically adjusted such that the sum of the device power limits of the group of devices does not exceed the group power limit. Dynamically adjusting the device power limits includes one or both of identifying a subset of lower-utilization devices and decreasing the device power limit of one or more of the lower-utilization devices or identifying a subset of higher-utilization devices and increasing the device power limits of one or more of the higher-utilization devices. This method may be embodied as a computer program product in a computer-readable medium for managing power in the electronic system.

Another embodiment provides a power-managed electronic system having a plurality of interconnected electronic devices. Each device includes a throttling mechanism for selectively limiting the power consumption of the device within an associated device power limit, and a power meter circuit for detecting the power consumption of the electronic device and outputting a power consumption signal representative of the detected power consumption. A power supply is provided for supplying a variable amount of power to each of the electronic devices. A power management module is in communication with the power meters for receiving the power consumption signals, computing the utilization of each device in terms of its power consumption, and dynamically adjusting the device power limits. The device power limits are dynamically adjusted by identifying a subset of lower-utilization devices and decreasing the device power limit of one or more of the lower-utilization devices, or identifying a subset of higher-utilization devices and increasing the device power limit of one or more of the higher-utilization devices, such that the sum of the device power limits does not exceed the group power limit. A local controller residing on each device is configured for enforcing the device power limit selected for that device.

Other embodiments, aspects, and advantages of the invention will be apparent from the following description and the appended claims.

DETAILED DESCRIPTION OF PREFERRED EMBODIMENTS

Figure 1:
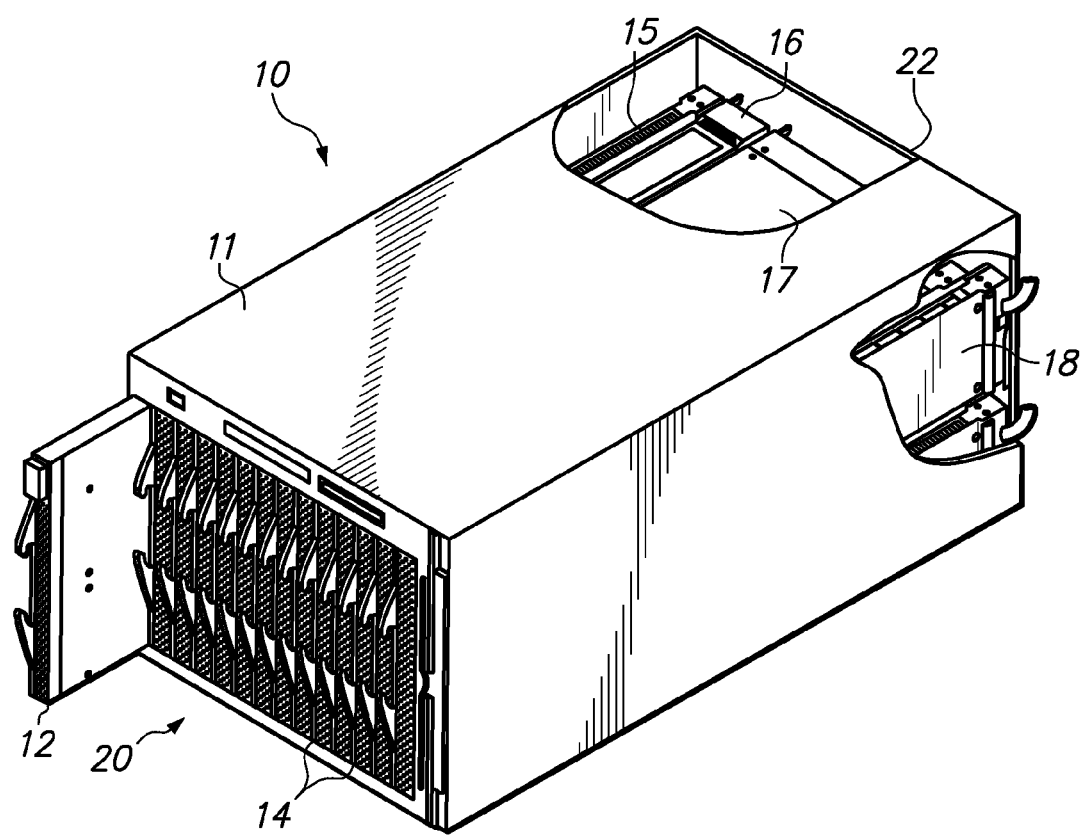
FIG. 1 is a perspective view of an exemplary rack-mountable, multi-server computer system that may be power-managed according to the invention.

The present invention provides a system, method, and computer program product for managing power in an electronic system having a plurality of power-consuming electronic devices. A power limit for a group of devices is provided and dynamically allocated among the devices within the group such that each device is operated within a device power limit. The device power limits are individually, dynamically adjusted in such a way that the sum of the device power limits is substantially equal to the group power limit. The invention is particularly applicable in the realm of computer systems having a plurality of rack-mounted servers and supporting hardware devices. Thus, the invention will be discussed extensively in the context of managing power to a computer system that includes a network of servers. One skilled in the art having benefit of this disclosure will appreciate that the invention may also be applied to other electronic systems having multiple power-consuming electronic devices.

According to one aspect of the invention, a variable group power limit is selected and enforced on a group of devices in an electronic system to limit the net power consumption of the group of devices. A variable device power limit is selected and enforced on each device, and the device power limits are adjusted to satisfy the current group power limit. The power management system and method may be controlled by a power management algorithm implemented in software that is embodied on a physical medium and usable by the electronic system. Generally, the power management algorithm may include a subroutine or software object for selectively increasing the device power limit of one or more of the most-utilized devices and a subroutine or software object for selectively decreasing the device power limit of one or more of the least-utilized devices. This power management method may be performed on multiple levels of a hierarchy of devices. For example, an electronic system may comprise a datacenter having multiple server racks, with each server rack having multiple servers. On one level, power to a group of servers in a particular rack may be managed such that power to a group of devices on a particular rack does not exceed a group power limit specified for that particular rack. On another level, power to the datacenter may be managed such that power to a group of racks does not exceed a group power limit specified for that group of racks, or for the datacenter as a whole.

In one embodiment, the current utilization of each device is computed as a ratio of the device power consumption to the device power limit. If the sum of the device power limits is less than the current group power limit, then the device power limit of one or more of the most utilized devices may be increased. If the sum of the device power limits is greater than the group power limit, the device power limit of one or more of the least utilized devices may be decreased. Small adjustments (increases or decreases) in the device power limits may be made, so that these adjustments may be spread out among multiple devices. For example, a programming loop may be executed wherein, in each iteration of the programming loop, the utilization of each device is computed and the device power limit of one or more of the most-utilized or least-utilized devices is adjusted by a small predefined increment or decrement.

In one embodiment, a subset of the least-utilized devices (such as a subset including 10% of the devices having the lowest utilization) and a subset of the most-utilized devices (such as a subset including 10% of the devices having the highest utilization) may be identified. The device power limits for one or more of the most-utilized devices may be increased, and the device power limits for one or more of the least-utilized devices may be decreased. In another embodiment, these adjustments may be made one device at a time. For example, in each iteration, the device power limit for only the single, least-utilized of all of the devices may be decreased or the device power limit for only the single, most-utilized of all the devices may be increased.

The programming loop may be executed until the sum of the device power limits substantially equals the group power limit. The group power limit may vary over time in response to various policy settings. If in a particular iteration increasing a device power limit by the predefined amount would cause the sum of the device power limits to appreciably exceed the group power limit, or decreasing a device power limit by the predefined amount would cause the sum of the device power limits to fall appreciably below the group power limit, then a smaller adjustment may be made in that iteration so that the sum of the device power limits equals the group power limit. In this manner, the device power limits may be as close to the group power limit as practicable, to maximize throughput of the devices without exceeding the group power limit.

FIG. 1 is a perspective view of an exemplary rack-mountable, multi-server computer system 10 that may be power-managed according to the invention. The computer system 10 includes a chassis 11 that houses a plurality of blade servers 12 and other hardware devices. Each blade server 12 may include one or more microprocessors, hard drives, and memory to service one or more common or independent networks. The computer system 10 also includes a variety of shared support modules, including a chassis management module 15, one or more power supply modules 16, one or more blower modules 17, and multiple switch modules 18. The management module 15 manages the chassis, blade servers, and other modules. The power modules 16 provide power to the system. The blower modules 17 generate airflow through the chassis 11 to cool the computer system. The switch modules 18 provide network connectivity between the blade server I/O and the network. An acoustic module (not shown) may be included to reduce noise. The blade servers 12 are installed in the front 20 of the chassis 11 and the support modules 15-18 are installed in the rear 22 of the chassis 11. The blade servers 12 and support modules 15-18 meet at an internal chassis interface known as the midplane, which provides all of the interconnections among the blade servers 12, modules, media tray, and DC power distribution throughout the chassis. Connectors at the midplane couple the blade servers 12 with the support modules 15-18 to reduce wiring requirements and facilitate installation and removal of the blade servers 12.

Figure 2:
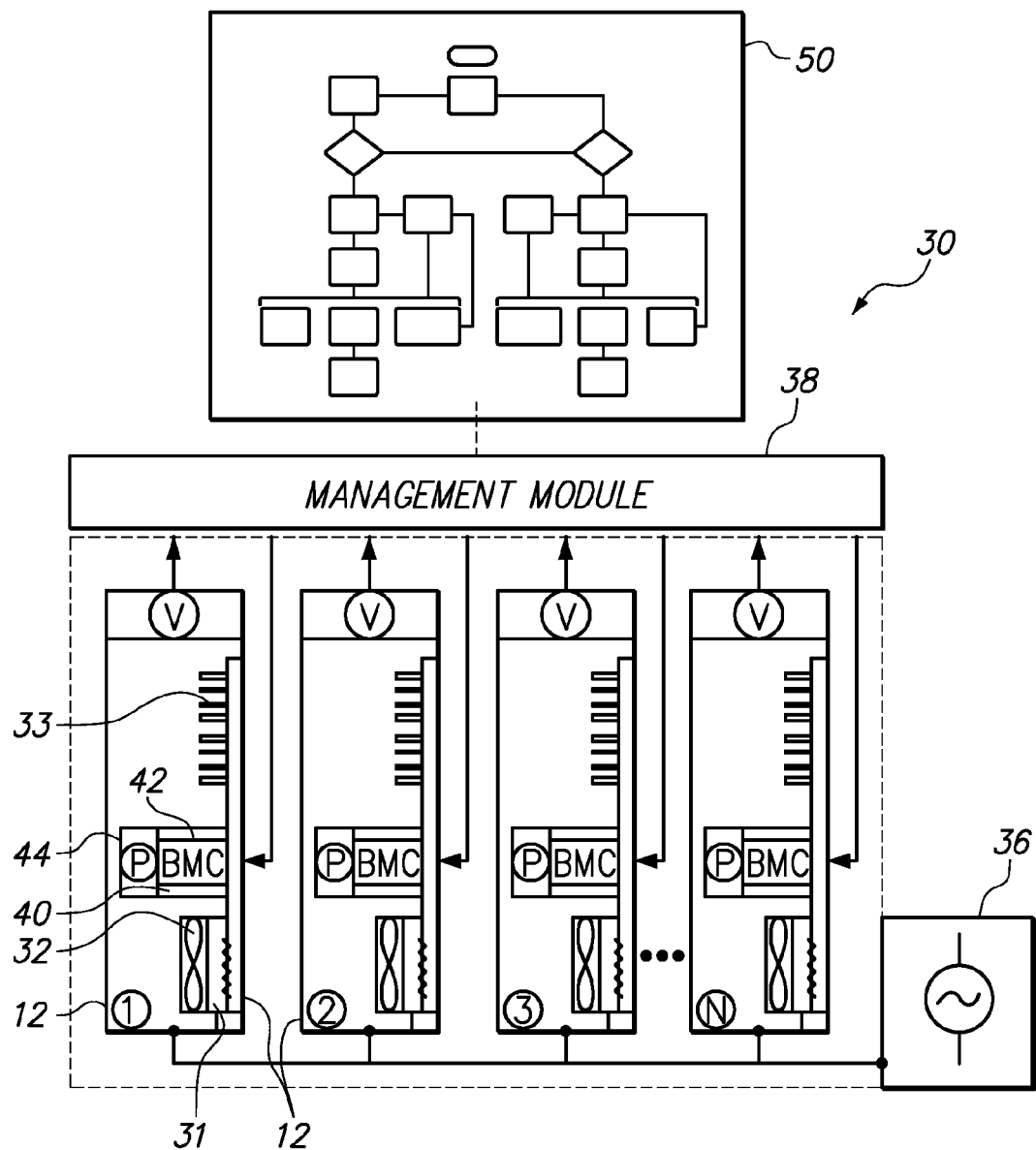
FIG. 2 is a schematic diagram of a power-managed computer system according to one embodiment of the invention, in the context of a multi-server computer system.

FIG. 2 is a schematic diagram of a power-managed computer system 30 according to one embodiment of the invention, in the context of a multi-server computer system. The computer system 30 may schematically represent, for example, the multi-server computer system 10 of FIG. 1 or a subsystem thereof. The computer system 30 includes a number "N" of servers 12. Each server 12 includes one or more processors or CPUs 31 and memory 33 that may be selectively throttled. A power supply 36 supplies power to the computer system 30. The power supply 36 is depicted here as a unitary power supply module shared among the servers 12, such as the power module 16 of FIG. 1. Alternatively, the power supply 36 may comprise multiple power modules, such as one on-board power supply module per server 12. A cooling unit 32 is also included for cooling the servers 12. Here, the cooling unit 32 is depicted as including one cooling fan per server 12. Alternatively, the cooling unit 32 may be, for example, a shared blower module such as the blower module 17 of FIG. 1 that generates airflow through a chassis to cool multiple servers 12. A power management module 38 is provided for managing power to the plurality of servers 12 by setting and dynamically adjusting a device power limit of each server 12. Each server 12 also includes a local controller 40 that works in tandem with the power management module 38 for controlling and managing power consumption, including enforcing the device power limit dynamically selected for the server 12 by the power management module 38.

Power-management software 50 usable by the power management module 38 and/or the servers 12 provides the logic for implementing a power management method. The software 50 may reside on a computer-readable physical medium. For the purposes of this description, a computer-readable physical medium can be any apparatus that can contain, store, communicate, propagate or transport the program for use by or in connection with the instruction execution system, apparatus or device. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W), and DVD. The medium can be an electronic, magnetic, optical, electromagnetic, infrared, or semiconductor system (or apparatus or device) or a propagation medium. The physical medium may be read by the computer system 10 into system memory of the management module 38, servers 12, or both, for being accessed and executed by the power management module 38 and servers 12. The processors 31 may be coupled directly or indirectly to memory 33 or other memory elements through a system bus. The memory 33 can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters. A user may enter commands and information into the computer system through input devices, such as a keyboard and a mouse. Other input devices may include a microphone, joystick, game pad, touch pad, satellite dish, scanner, or the like. These and other input devices are often connected to processing unit through a USB (universal serial bus) that is coupled to the system bus, but may be connected by other interfaces, such as a serial port interface, a parallel port, game port, or the like. A graphical user interface (GUI) including a display device may also be connected to a system bus via an interface, such as a video adapter. Thus, a user such as a system administrator may, for example, input and edit policy settings.

Examples of user-selectable policy settings may include, without limitation, how the system should handle decisions related to performance, fault management, security, and energy efficiency. The system will ultimately use these policy settings to establish additional criteria for the allocation of workload to the servers. For example, policy settings may designate some of the servers as having a higher priority or even as "mission-critical" and other servers as having a lower priority or even "non-mission critical." A failover policy setting may specify that workload on the lower priority or non-mission-critical servers be temporarily suspended to shift workload from the higher-priority or mission-critical servers to the lower-priority or non-mission-critical servers in the event that a fault condition is detected on the higher-priority or mission-critical servers. Another example of a policy setting related to energy management is to specify that in situations where all servers are experiencing an increased workload, certain mission-critical servers should be allowed to increase their device limits at the expense of decreasing the device limit of non-mission-critical servers.

The local controller 40 in this embodiment includes a baseboard management controller (BMC) 42. The BMC 42 is a specialized microcontroller embedded in the motherboard and is a component in the Intelligent Platform Management Interface (IPMI) architecture. The function of the BMC 42 conventionally includes receiving input from sensors and sending an alert to the administrator if any parameters do not stay within predefined limits. The BMC manages the interface between system management software and platform hardware. Sensors built into the computer system report to the BMC on parameters such as power, temperature, cooling fan speeds, and operating system (OS) status. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again. The embedded sensors include a power sensor 44 that senses power consumption by the server 12 and outputs a signal representative thereof. The power management module 38 communicates with the power meters 44 and processes the power consumption signals to control power to the servers in a manner prescribed by the inventive methods detailed below.

In one exemplary architecture, physical interfaces to the BMC may include SMBus busses, a serial-communication interface such as an RS-485 serial console, address and data lines and an Intelligent Platform Management Bus (IPMB), that enables the BMC to accept IPMI request messages from other management controllers in the system. The BMC may communicate with a BMC management utility (BMU) on a remote client using IPMI protocols. The BMU is usually a command line interface (CLI) application. Connection to the BMC over LAN may or may not use encryption depending on the security concerns of the user. In addition to conventional functionality of the BMC 40, the BMC 40 is configured to enforce dynamic device power limits on the respective server 12 according to an embodiment of a power management method. Although a particular architecture is described here by way of example, the invention contemplates that this BMC architecture is subject to change over time, and that the invention may be adapted to work with such revised architectures. The invention further contemplates alternative embodiments of a power-managed computer system that may implement a power management method without the use of a BMC.

Each server has, by design, a maximum power consumption value it can sustain under normal operation. This "maximum power capacity" is typically a hardware limitation, such as the maximum amount of power the power supply is physically capable of supplying to that server or an upper limit on how much energy the server was designed to draw from the power supply. Each server also has, by design, a "minimum power consumption level," which is a lower boundary on how much power the server will consume when powered on, such as when the server is idling. The minimum power consumption level of some servers may be nearly zero. According to one aspect of the invention, a variable device power limit may be imposed on each server that is less than the server's maximum power capacity. The power management module 38 may select and dynamically, independently adjust the device power limit on each server 12, to be enforced by the local controller 40 of each server 12. The value of the device power limit for each server 12 may vary anywhere within the range between the server's maximum and minimum power consumption level, but does not necessarily vary to the full extent of that range. For example, a server may have a maximum power capacity of 100 W and a minimum power consumption level of 5 W, and the power management module 38 may vary the device power limit of that server within a range of between 20 W and 80 W.

According to the power management method, the management module 38 may dynamically adjust the device power limit for each server 12 according to the "utilization" of the server. The utilization of a server is related to its real-time power consumption, and may be expressed as a comparative value relating the current power consumption of the server with the current device power limit or the maximum power capacity for the server. The utilization of a server may be expressed, for example, as the ratio or percentage of the instantaneous power consumption of the server to its device power limit at that instant. Alternatively, the utilization of a server may be expressed as the ratio or percentage of the instantaneous power consumption of the server to its maximum power capacity. To illustrate, a server having a maximum power capacity of 100 W, a current device power limit of 80 W and a current power consumption of 40 W at a particular instant would have a utilization of 50% according to the former utilization definition or a utilization of 40% according to the latter utilization definition. Other utilization definitions are also within the scope of the invention.

A variety of techniques may be used by the local controller 40 to enforce the device power limits on the servers 12. Such techniques may include selectively "throttling" the processor 31 or memory 33, placing subsystems into power-saving modes of operation, or powering off unused circuitry. Other examples of limiting power consumption include reducing a clock frequency or operating voltage of the processors 34, introducing wait or hold states into the activity of the processors 31, performing processor clock gating, reducing processor supply voltages, or migrating workload between the devices. Although there may be some correlation between processor load and power consumption in a server, processor load is not always a reliable indicator of power consumption because of the behaviors of the underlying microarchitectures, transistor variability on a per-chip basis, and many other complex factors that affect power consumption. Therefore, the local controller 40 typically includes a precision measurement and feedback control system that may be implemented, for example, using a hard, real-time function running on the BMC. The local controllers 40, by virtue of the BMC 42 and power meter 44, are capable of adjusting power on a millisecond time scale, as a hard, real-time proportional control system. This functionality may be used by the software 50 to implement power management according to the invention.

Figure 3:
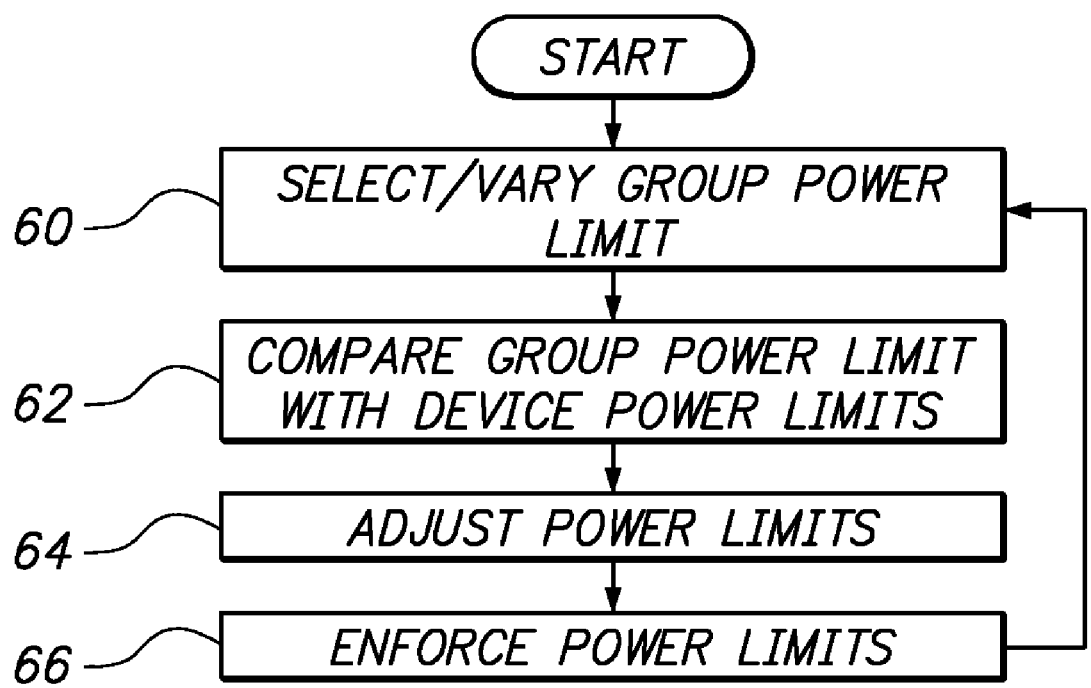
FIG. 3 is a flowchart outlining an exemplary method of controlling power consumed by a computer system according to one embodiment of the invention.

FIG. 3 is a flowchart outlining an exemplary method of controlling power to a computer system according to one embodiment of the invention. The steps of the flowchart may be implemented by software, such as the software 50 used by the power-managed computer system 30 of FIG. 2. The method contemplates that the computer system includes a group of power-consuming electronic devices, such as a group of servers. A device power limit may be enforced on each device, and a "group power limit" may be enforced on the total group. For example, in a group of ten devices each having a maximum operating capacity of 100 W, an independently-adjustable device power limit of up to 100 W each may be imposed. The group of devices would have a maximum operating capacity of 1000 W (10 servers×100 W/server), and a group power limit of up to 1000 W may therefore be imposed on the group of devices.

In step 60, the group power limit is selected. The group power limit is dynamic, and may vary over time in response to various policy considerations. For example, in many energy markets, the price of electrical power varies throughout the day, in which case one policy consideration might be to reduce the group power limit during peak pricing hours. Thus, the flowchart of FIG. 3 is structured as a loop, wherein step 60 is repeated cyclically, and the selected group power limit may vary over time. In step 62, the group power limit is compared with the device power limits. In particular, the group power limit may be compared with the sum of the device power limits to ensure that the sum of the device power limits does not exceed the group power limit. In step 64, the device power limits may be adjusted such that the sum of the device power limits does not exceed the group power limit. The current device power limits are then enforced according to step 66. Due to the physical limitations on executing software steps performed by a machine, such as the timescale at which the steps of the flowchart are capable of being executed, there may be a brief period of time during which the sum of the device power limits does exceed the group power limit. Any such delays are preferably minimized, and the processors for carrying out instructions on a computer system are generally sufficiently fast to minimize such a delay. For example, the group power limit may be reduced in one iteration of step 60, and a short period of time may elapse during which the comparison step 62 is performed and before the device power limits may be adjusted in step 64 and enforced in step 66.

Various approaches may be followed to adjust and enforce the device power limits in a power management method according to the invention. Generally, one approach is to identify in each iteration of step 64 a subset of higher-utilization devices ("HUDs") in the group and selectively increase the device power limit of one or more of that subset, if the sum of the device power limits is determined in step 62 to be less than the group power limit. For example, the subset of higher-utilization devices may be as few as one device, such as the single, most-utilized device in the group. Alternatively, the subset of higher-utilization devices may be multiple devices, such as a selected percentage of most-utilized devices. For example, the subset of higher-utilization devices may be the 10% of the group having the highest utilization, and one or more devices in the subset (but not necessarily the least-utilized device) may be selected for a device power limit increase. Similarly, a subset of one or more low-utilization devices ("LUD") in the group may be identified in step 64 and the device power limit of one or more of these may be reduced, if the sum of the device power limits is determined in step 62 to be greater than the group power limit. For example, the device power limit of the single, least-utilized device may be decreased. Alternatively, the device power limit for one or more devices in a subset of lower-utilization devices (but not necessarily the least-utilized device) may be decreased. The steps of the method outlined in FIG. 3 may be executed with even further particularity, to produce more detailed algorithms for implementing the power management method.

Figure 4:
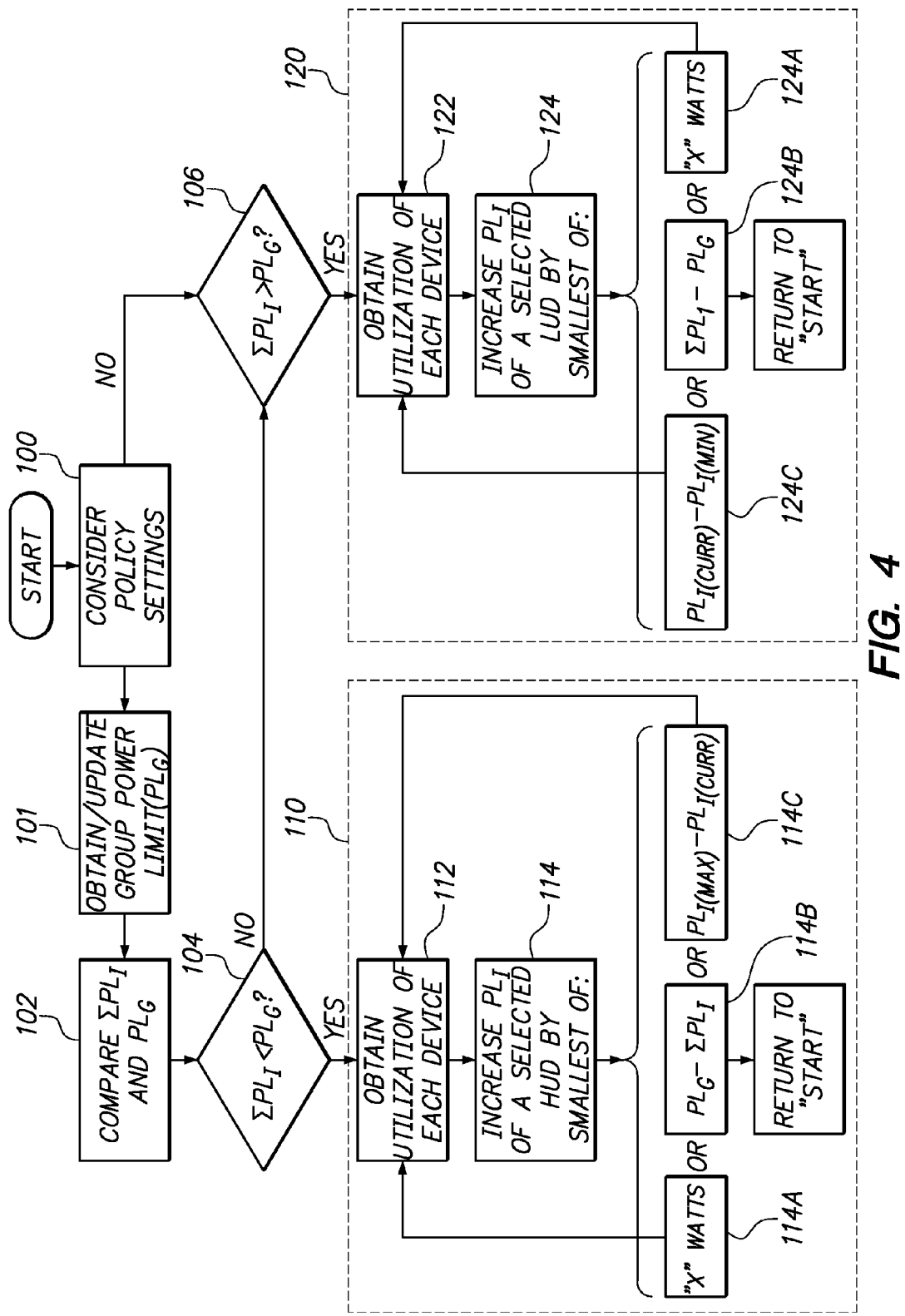
FIG. 4 is a flowchart outlining a more specific and detailed embodiment of an algorithm for limiting power consumption by the computer system.

FIG. 4 is a flowchart outlining a more specific and detailed embodiment of an algorithm for managing power to the computer system. In step 100, policy considerations such as those listed above are taken into consideration. For example, the time of day and the time-variable cost of power at that particular time may be considered in determining how much power to be allocated to the computer system. In step 101, a group power limit ($PL_G$) is obtained. The group power limit is updated upon each iteration of step 101. In some iterations of step 101, the group power limit will change, and in other iterations it will not. The group power limit may change, for example, due to the policy settings considered in step 100, such as in response to time-varying energy costs, power availability, or according to the preference for using servers in particular areas of the datacenter according to the nature of the workload presented. In step 102, the sum of the device power limits ($\Sigma PL_I$) is compared with the group power limit. Conditional steps 104 and 106 are used to determine whether the sum of the device power limits is less than or greater than the group power limit. If the sum of the device power limits is neither greater nor less than the group power limit, the algorithm cycles directly back to step 101 for updating the group power limit. If the sum of the device power limits is less than the group power limit according to conditional step 104, then a subroutine ("loop") 110 is triggered to selectively increase the device power limits. If the sum of the device power limits is greater than the group power limit according to conditional step 106, then another subroutine ("loop") 120 is triggered to selectively decrease the device power limits.

Fuzzy logic may be employed in the execution of steps 104 and 106 in that a programmer or user of software used to implement the algorithm of FIG. 4 may select the level of precision required to trigger either of conditional steps 104 and 106. For example, a programmer (e.g., in authoring the code) or user (e.g., in selecting user preferences in a graphical user interface) may specify that the sum of the device power limits must be less than the group power limit (step 104) or greater than the group power limit (step 106) by at least a selected setpoint value. Using a setpoint would be desirable, for example, to prevent unnecessary adjustments when the sum of the device power limits are already nearly equal to the group power limit.

Referring to loop 110, the utilization level of each device is obtained in step 112. Examples of how utilization may be obtained have been described previously. For the purpose of discussing the algorithm in FIG. 4, it will be assumed that utilization of a particular device is the ratio or percentage of the current power consumption of that device to the current device power limit. It will also be assumed that the device power limits are increased one device at a time, though another embodiment may increase the device power limits of multiple devices at substantially the same time. In step 114, the device power limit of a selected HUD is increased by the smallest of three values listed as optional values 114A, 114B, and 114C. The selected HUD may be a device selected from a subset of one or more HUDs, such as the 10% most-utilized devices in the group, or the subset may be as small as a single HUD. If the HUD is to be selected from a subset of multiple HUDs, the policy settings may be taken into account, such as to select a higher-priority server from among the subset of HUDs. In one example, the most-utilized device is selected, i.e., the device currently having the highest ratio of power consumption to device power limit and, correspondingly, having the smallest margin between its device power limit and power consumption. In cases where two devices have the same highest utilization value, a tie-breaker may be used or the amount of any device power limit increase may be split among the tied most-utilized devices. According to step 114, the device power limit of the selected HUD may be increased by the smallest of three values described in a menu of optional values 114A, 114B, and 114C. Specifically, the device power limit of the selected HUD may be increased by a default constant of "X" watts (optional value 114A), the difference between the group power limit and the sum of the individual power limits (optional value 114B), or the difference between the maximum power capacity $PL_{I(MAX)}$ and the current device power limit for the currently most-utilized device (optional value 114C). If optional value 114A is selected, the device power limit is increased by the default value X, and the loop 110 repeats from step 112. In the next iteration of loop 110, the utilization values are recomputed, and the previous device power limit increase on the selected HUD may result in a different subset of HUDs. This approach prioritizes the increases in the device power limits according to the power needs of the devices by systematically increasing the device power limits of the devices that need the most power, X watts at a time.

One or more iterations of loop 110 are performed, each time incrementing the device power limit of the selected HUD until the sum of the device power limits equals the group power limit. In each iteration of the loop 110, X is selected as the default increase (optional value 114A), unless and until that default increase would cause the currently selected HUD to exceed its maximum power capacity $PL_{I(MAX)}$, or cause the sum of the device power limits to exceed the group power limit. Optional values 114B, 114C are specified for those exceptions. In particular, optional value 114C is selected if the smallest of the three optional values is $PL_{I(MAX)}$-$PL_{I(CURR)}$. As a result of selecting optional value 114C, the device power limit for the currently most-utilized device is increased to the full value of its $PL_{I(MAX)}$ and cannot be further increased. Any device whose device power limit currently equals $PL_{I(MAX)}$ in step 114 may, therefore, be temporarily excluded from a further device power limit increase in loop 110, in which case the device power limit increase may instead be applied to the most-utilized device in the group whose device power limit is less than its $PL_{I(MAX)}$. The temporarily-excluded device(s) may be later re-included as a candidate for a device power limit increase, such as when and if the associated device power limit is lowered in a subsequent performance of loop 120 (discussed below). The loop 110 is repeated until the sum of the device power limits equals the currently selected group power limit. Specifically, the loop 110 is repeated until optional value 114B is selected. Selecting optional value 114B causes the sum of the device power limits to equal the group power limit. After optional value 114B is selected, the algorithm therefore returns to step 101 to update the group power limit.

If the sum of the device power limits is, instead, greater than the group power limit, as determined in conditional step 106, one or more of the device power limits needs to be decreased to satisfy the group power limit. This can occur if the group power limit is reduced in an iteration of step 101, such as if a power-budgeting mode is entered during peak pricing hours. Thus, triggering conditional step 106 leads to a loop 120 on the right-hand side of the flowchart for selectively decreasing the device power limits until the sum of the device power limits no longer exceeds the group power limit. To maximize server throughput, the loop 120 decreases the device power limits just enough that the sum of the device power limits is substantially equal to the group power limit. In step 122, the utilization level of each device is obtained, as described previously. A subset of LUDs is selected, which, again, may include multiple LUDs or a single LUD. In one example, the least-utilized device—i.e., the device having the lowest ratio of power consumption to device power limit and, correspondingly, the greatest margin between device power limit and its power consumption—may be readily identified from the computed utilization of each device.

In loop 120, the device power limit of one or more of the LUDs is decreased. In cases where two devices have the same lowest utilization value, a tie-breaker may be used or the amount of any decrease may be split among the tied least-utilized devices. According to step 124, the device power limit of the currently selected LUD may be decreased by the smallest of three values described in a menu of optional values 124A, 124B, and 124C. Specifically, the device power limit of the selected LUD may be decreased by a default constant of X watts (optional value 124A), the difference between the sum of the individual power limits and the group power limit (optional value 124B), or the difference between the current device power limit and the minimum power capacity $PL_{I(MIN)}$ for the currently selected LUD (optional value 124C). If optional value 124A is selected, the device power limit is decreased by the default value X, and the loop 120 repeats from step 122. In the next iteration of loop 110, the utilization values are recomputed, and the previous device power limit decrease on one of the devices may lead to a different device being the currently least-utilized device in this subsequent iteration. This approach prioritizes the decreases in the device power limits according to the power needs of the devices by systematically decreasing the device power limits of the devices that need the least power, X watts at a time.

One or more iterations of loop 120 may be performed, each time decrementing the device power limit of the currently selected LUD, until the sum of the device power limits equals the group power limit. Again, the level of precision required to make this determination may be selected by the user or programmer, and fuzzy logic may be used if desired. In each iteration of loop 120, X is selected as the default decrease, unless and until that default decrease would cause the currently selected LUD to fall below its minimum power capacity $PL_{I(MIN)}$, or cause the sum of the device power limits to fall below the group power limit. Optional values 124B and 124C are specified for those exceptions. In particular, optional value 124C is selected if the smallest of the three optional values is $PL_{I(CURR)}-PL_{I(MIN)}$. As a result of selecting optional value 124C, the device power limit for the currently selected LUD is decreased to its $PL_{I(MIN)}$ and cannot be further decreased. Any device whose device power limit currently equals $PL_{I(MIN)}$ in step 124 is, therefore, temporarily excluded from a further device power limit decrease in loop 122, in which case the device power limit decrease may instead be applied to the another LUD in the group whose device power limit is greater than its $PL_{I(MIN)}$. The temporarily-excluded device(s) may be later re-included as a candidate for a device power limit decrease, such as when and if the associated device power limit is raised in a subsequent performance of loop 110 (discussed above). The loop 120 is repeated until the sum of the device power limits equals the currently selected group power limit. Specifically, the loop 120 is repeated until optional value 124B is selected. Selecting optional value 124B causes the sum of the device power limits to equal the group power limit. After optional value 124B is selected, the algorithm therefore returns to step 101 to update the group power limit.

The consideration of policy settings according to step 100 may also allow the algorithm to break out of a cycle that can otherwise occur under certain conditions, such as when the sum of the power limits equals the group power limit in either of steps 114B or 124B. In such a scenario, the power allocation to the servers may remain static for many cycles of step 101 until consideration of policy settings in step 100 affects the group power limit in step 101. For example, in one scenario a higher-utilization and/or high-priority server could benefit from additional power allocation (via an increase in device power limit) if it were available, but the sum of the device power limits and the group power limit may be in equilibrium in each iteration of step 114. In that case, the device power limit may be reduced for one or more low-utilized devices or lower-priority but higher-utilized devices, so that the device power limit could be increased for one or more higher-priority or higher-utilized devices, without the sum of the device power limits exceeding the group power limit.

Optionally, if the group power limit changes prior to completion of loop 110 or loop 120, the algorithm may be configured to abort loop 110 or 120, and return to step 101 for updating the group power limit.

Figure 5:
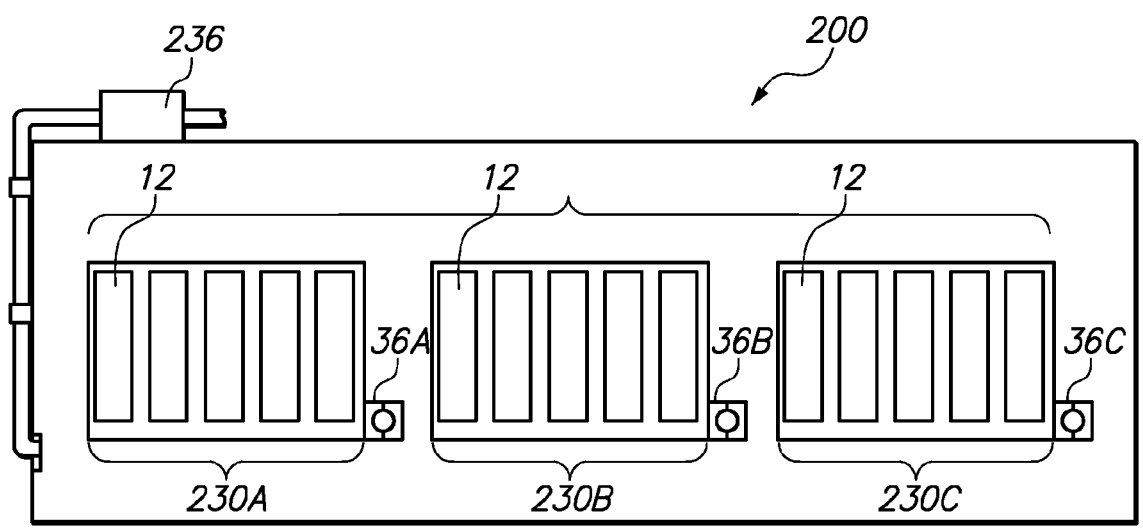
FIG. 5 is a schematic diagram of an electronic system illustrating an example of how a power management method according to the invention may be simultaneously applied to multiple levels of the electronic system.

FIG. 5 is a schematic diagram of an electronic system illustrating an example of how power is managed in another embodiment of the invention according to a system hierarchy applied to the electronic system. The electronic system of FIG. 5 includes a datacenter 200 having three server racks 230A, 230B, 230C. The racks 230A-C need not be identical, but are drawn as though they are identical to simplify the discussion. A main power supply 236 supplies the datacenter 200. The racks 230A-C may all be fed by the main power supply 236. Each rack 230A-C includes a plurality of five servers 12 and one power supply 36A-C per rack. Power may be simultaneously managed according to a power management method of the invention on first and second levels, concurrently. On a first level of the hierarchy, each rack may be treated as a group, and each server may be treated as a device of that second-level group. On a second level, the entire datacenter may be treated as a group, and each rack may be treated as a "device" of that second-level group. Two separate and distinct group power limits may be selected for each of these two levels, respectively. Power may be managed among the devices of each level according to the group/device relationship specified, for example, in the power management algorithm of FIG. 4.

To elaborate, on the first level of a power management method, each rack 230A-C may be treated as a group, and each server 12 may be treated as a "device" of the group to which it belongs. Power to each group (rack 230A, 230B, or 230C) may be managed according to the invention, such as according to the algorithm of FIG. 4. A group power limit may be uniquely specified for each rack 230A-C, to be supplied by the power supplies 36A, 36B, and 36C, respectively. A dynamic device power limit may be dynamically adjusted for each server 12 such that the sum of the device power limits of the five servers 12 in each rack 230A, 230B, or 230C does not exceed the group power limit specified for that rack.

On the second level, the entire datacenter 200 may be treated as the "group," and each rack 230A-C may be treated as a "device" of that group. Power to the group (the datacenter 200) may be managed according to the invention, such as according to the algorithm of FIG. 4. For instance, a group power limit may be specified for the entire datacenter 200, to be supplied by the main power supply 236. A dynamic device power limit may be specified and dynamically adjusted for each rack 230A, 230B, 230C, such that the sum of the device power limits of the three racks 230A, 230B, and 230C does not exceed the group power limit specified for the datacenter 200.

One skilled in the art having benefit of this disclosure will appreciate that still further levels may be conceived, wherein power is managed on each level according to the device/group relationship specified in the power management algorithm of FIG. 4.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of limiting power consumption by an electronic system having a plurality of power-consuming electronic devices, the method comprising:
   selecting a group power limit for the plurality of devices;
   selecting and enforcing a device power limit for each device and dynamically adjusting the device power limits such that the sum of the device power limits of the group of devices does not exceed the group power limit; and
   wherein the step of dynamically adjusting the device power limits includes one or both of identifying a subset of lower-utilization devices and decreasing the device power limit of one or more of the lower-utilization devices or identifying a subset of higher-utilization devices and increasing the device power limits of one or more of the higher-utilization devices, wherein the utilization of each device is the ratio of the power consumed by the device to the current device power limit.

2. The method of claim 1, further comprising:
   dynamically adjusting the group power limit;
   comparing the dynamically-adjusted group power limit with the sum of the device power limits;
   decreasing the device power limit of one or more of the lower-utilization devices in response to the group power limit being less than the sum of the device power limits; and
   increasing the device power limit of one or more of the higher-utilization device in response to the group power limit being larger than the sum of the device power limits.

3. The method of claim 2, further comprising:
   decreasing the device power limit of the one or more of the lower-utilization devices by the smallest of (a) a predetermined constant value, (b) the difference between the sum of the device power limits and the group power limit, and (c) the difference between the device power limit of the current least-utilized device and a minimum device power limit of the current least-utilized device.

4. The method of claim 3, further comprising repeating the step of decreasing the device power limit until the sum of the device power limits is substantially equal to the group power limit.

5. The method of claim 2, further comprising:
   increasing the device power limit of one of the higher-utilization devices by the smallest of (a) a predetermined constant value, (b) the difference between the group power limit and the sum of the device power limits, and (c) the difference between a maximum power capacity of the current most-utilized device and the device power limit of the current most-utilized device.

6. The method of claim 5, further comprising repeating the step of increasing the device power limit until the sum of the device power limits is substantially equal to the group power limit.

7. The method of claim 1, further comprising enforcing the device power limits on the devices by performing processor clock gating, reducing processor supply voltages, reducing processor clock frequency, or migrating workload between the devices.

8. The method of claim 1, wherein the subset of lower-utilization devices is the single, least-utilized device, and the subset of higher-utilization devices is the single, most-utilized device.

9. A computer program product including computer usable program code embodied on a non-transitory computer usable medium for managing power in an electronic system having a plurality of power-consuming electronic devices, the computer program product comprising:
   instructions for selecting a group power limit for the plurality of devices;
   instructions for selecting and enforcing a device power limit for each device and dynamically adjusting the device power limits such that the sum of the device power limits of the group of devices is within the group power limit; and
   wherein the instructions for dynamically adjusting the device power limits includes instructions for identifying a current least-utilized device and decreasing the device power limit of the current least-utilized device or identifying a current most-utilized device and increasing the device power limit of the current most-utilized device, wherein the utilization of each device is the ratio of the power consumed by the device to the current device power limit.

10. The computer program product of claim 9, further comprising:
    instructions for dynamically adjusting the group power limit;
    instructions for comparing the dynamically-adjusted group power limit with the sum of the device power limits;
    instructions for decreasing the device power limit of the current least-utilized device in response to the group power limit being less than the sum of the device power limits; and
    instructions for increasing the device power limit of the current most-utilized device in response to the group power limit being larger than the sum of the device power limits.

11. The computer program product of claim 10, further comprising:

instructions for decreasing the device power limit of the current least-utilized device by the smallest of (a) a predetermined constant value, (b) the difference between the sum of the device power limits and the group power limit, and (c) the difference between the device power limit of the current least-utilized device and a minimum device power limit of the current least-utilized device.

12. The computer program product of claim 11, further comprising instructions for repeating the step of decreasing the device power limit until the sum of the device power limits is substantially equal to the group power limit.

13. The computer program product of claim 10, further comprising:
instructions for increasing the device power limit of the current most-utilized device by the smallest of (a) a predetermined constant value, (b) the difference between the group power limit and the sum of the device power limits, and (c) the difference between a maximum power capacity of the current most-utilized device and the device power limit of the current most-utilized device.

14. The computer program product of claim 13, further comprising instructions for repeating the step of increasing the device power limit until the sum of the device power limits is substantially equal to the group power limit.

15. The computer program product of claim 9, further comprising instructions for enforcing the device power limits on the devices by performing processor clock gating, reducing processor supply voltages, reducing processor clock frequency, or migrating workload between the devices.

16. A power-managed electronic system, comprising:
a plurality of interconnected electronic devices each including a throttling mechanism for selectively limiting the power consumption of the device within an associated device power limit, and a power meter circuit for detecting the power consumption of the electronic device and outputting a power consumption signal representative of the detected power consumption;
a power supply for supplying a variable amount of power to each of the electronic devices;
a power management module in communication with the power meters for receiving the power consumption signals, computing the utilization of each device in terms of its power consumption, and dynamically adjusting the device power limits by identifying a subset of lower-utilization devices and decreasing the device power limit of one or more of the lower-utilization devices or identifying a subset of higher-utilization devices and increasing the device power limit of one or more of the higher-utilization devices, wherein the utilization of each device is the ratio of the power consumed by the device to the current device power limit, such that the sum of the device power limits is within the group power limit; and
a local controller residing on each device and configured for enforcing the device power limit selected for that device.

17. The power-managed electronic system of claim 16, wherein the local controller comprises a baseboard management controller.

18. The power-managed electronic system of claim 16, wherein the local controller is configured for selectively throttling processor or memory, placing subsystems into power-saving modes of operation, powering off unused circuitry, reducing a clock frequency or operating voltage of the processors, introducing wait or hold states into the activity of the processors, performing processor clock gating, reducing processor supply voltages, or migrating workload between the devices, to enforce the device power limit.

* * * * *